United States Patent
Hawkins

(10) Patent No.: US 7,726,063 B2
(45) Date of Patent: Jun. 1, 2010

(54) SNAKE TRAP

(76) Inventor: Arthur Graham Hawkins, 3426 Far Hill Cir., Birmingham, AL (US) 35243

( * ) Notice: Subject to any disclaimer, the term of this patent is extended or adjusted under 35 U.S.C. 154(b) by 0 days.

(21) Appl. No.: 11/415,331

(22) Filed: May 1, 2006

(65) Prior Publication Data
US 2007/0011942 A1 Jan. 18, 2007

Related U.S. Application Data

(60) Provisional application No. 60/698,641, filed on Jul. 13, 2005.

(51) Int. Cl.
*A01M 23/00* (2006.01)
(52) U.S. Cl. .................. 43/58; 43/114; 43/136
(58) Field of Classification Search .................. 43/58, 43/114, 136, 121, 115, 116, 117
See application file for complete search history.

(56) References Cited

U.S. PATENT DOCUMENTS

| | | | | |
|---|---|---|---|---|
| 2,962,836 | A | | 12/1960 | Hughes |
| 3,913,259 | A | * | 10/1975 | Nishimura et al. ............ 43/114 |
| 4,208,828 | A | * | 6/1980 | Hall et al. ..................... 43/114 |
| 4,244,134 | A | * | 1/1981 | Otterson ....................... 43/58 |
| 4,349,981 | A | * | 9/1982 | Sherman ...................... 43/131 |
| 4,425,731 | A | | 1/1984 | Orlando |
| 4,449,316 | A | | 5/1984 | Moorhead |
| 4,815,231 | A | * | 3/1989 | McQueen .................... 43/114 |
| 5,175,956 | A | * | 1/1993 | Hover et al. ................... 43/58 |
| 5,497,576 | A | * | 3/1996 | Nowak .......................... 43/58 |
| 5,572,825 | A | * | 11/1996 | Gehret ......................... 43/114 |
| 5,588,250 | A | * | 12/1996 | Chiba et al. .................. 43/114 |
| 5,768,821 | A | * | 6/1998 | Currey ......................... 43/114 |
| 6,041,543 | A | * | 3/2000 | Howse ....................... 43/132.1 |

FOREIGN PATENT DOCUMENTS

DE 3127234 1/1983

* cited by examiner

*Primary Examiner*—Christopher P Ellis
(74) *Attorney, Agent, or Firm*—Diane H. Crawley

(57) ABSTRACT

An apparatus for trapping a snake comprising a base wall having a smooth interior surface and an exterior surface, first and second side walls having a smooth interior surface and an exterior surface and having first edges attached to opposing edges of said base wall, a top wall having a smooth interior surface and an exterior surface and having opposing edges attached to second edges of said first and second side walls, wherein said first and second side walls, said base wall and said top wall define a tunnel therein, the tunnel including a first area for placing a sticky pad for trapping the snake coming into contact with the sticky pad and at least one second area through which the snake must pass before reaching the first area, the second area having a smooth inner surface for denying traction to the snake trapped on the sticky pad and having a sufficient length and width to allow substantially an entire body of the snake to enter the tunnel prior to encountering the sticky pad.

18 Claims, 3 Drawing Sheets

SNAKE TRAP

CROSS REFERENCE TO RELATED APPLICATIONS

This application claims priority from U.S. provisional Patent Application No. 60/698,641, filed Jul. 13, 2005 by Arthur G. Hawkins, Jr. entitled Cahaba Snake Trap, which is incorporated herein by reference.

TECHNICAL FIELD OF THE INVENTION

The present invention relates to pest control, more particularly to an apparatus for trapping snakes.

BACKGROUND OF THE INVENTION

Traps which utilize glue or adhesives to trap rats and mice are well known in the art. Typically such a trap comprises a plate or tray covered with glue or adhesive. When such traps are placed in areas where rats or mice are present, the rodents are trapped when they step into the glue or adhesive. Other snake trap patents exist which utilize adhesive and other means for trapping snakes.

Typical adhesive traps are not effective in trapping snakes, however, because of a snake's inherent ability to avoid or escape from such traps. Snakes generally crawl with their head held slightly off the ground, using lateral movements of their body to push their head forward. A snake encountering such a plate or tray trap might crawl around the trap, choosing the known of the surface it is crawling on to the unknown of the open trap surface. Even if the snake does proceed onto the tray or plate, it would likely only just barely touch the adhesive with its neck before sensing the adhesive and stopping. The snake would then be able to use the entire rest of its body to thrash about and free itself from the glue or jerk its head back out of the glue. The snake could use any rough surfaces around the trap to leverage its body and pull its neck free. If the snake only slightly contacts the adhesive of an open glue or adhesive trap it can jerk its head up and to the side and go around the trap. Enclosed adhesive traps generally do not have openings that are positioned and sized to be attractive to snakes, are not shaped and sized to capitalize on basic snake behaviors, and do not have means for preventing a snake's escape should a snake enter and contact the adhesive. Open traps are subject not only to easy escape by snakes, but also to degradation of the adhesive from dust and debris, weather or other surfaces of a non-rigid trap itself. Enclosed, non-rigid traps are also subject to degradation of the adhesive from contact with the other surfaces of the trap itself. Open traps may also pose a hazard to pets and small children.

SUMMARY OF THE PRESENT INVENTION

The present invention in one embodiment thereof, comprises an apparatus for trapping a snake comprising a base wall having a smooth interior surface and an exterior surface, first and second side walls having a smooth interior surface and an exterior surface and having first edges attached to opposing edges of said base wall, a top wall having a smooth interior surface and an exterior surface and having opposing edges attached to second edges of said first and second side walls, wherein said first and second side walls, said base wall and said top wall define a tunnel therein, the tunnel including a first area for placing a sticky pad for trapping the snake coming into contact with the sticky pad and at least one second area through which the snake must pass before reaching the first area, the second area having a smooth inner surface for denying traction to the snake trapped on the sticky pad and having a sufficient length and width to allow substantially an entire body of the snake to enter the tunnel prior to encountering the sticky pad.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
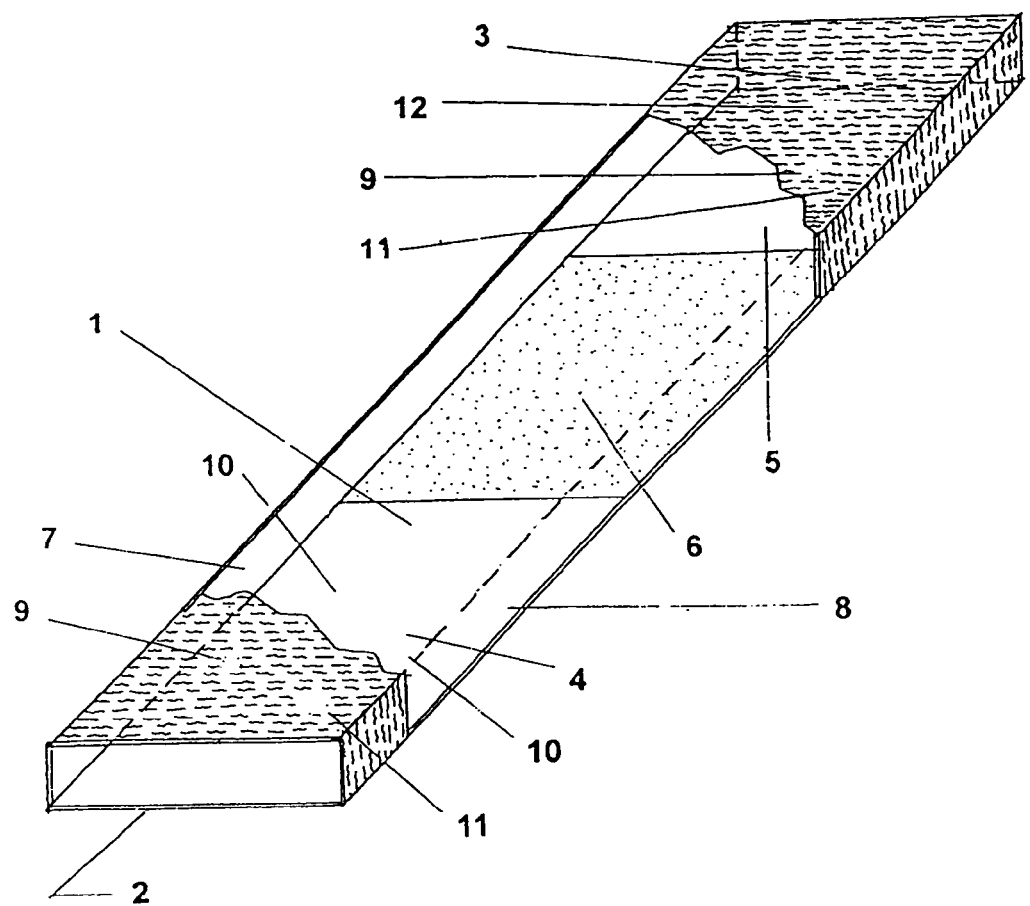
FIG. 1 is a perspective view of the preferred embodiment, showing the trap.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present inventions based on the following examples of possible embodiments of the present invention.

Figure 2:
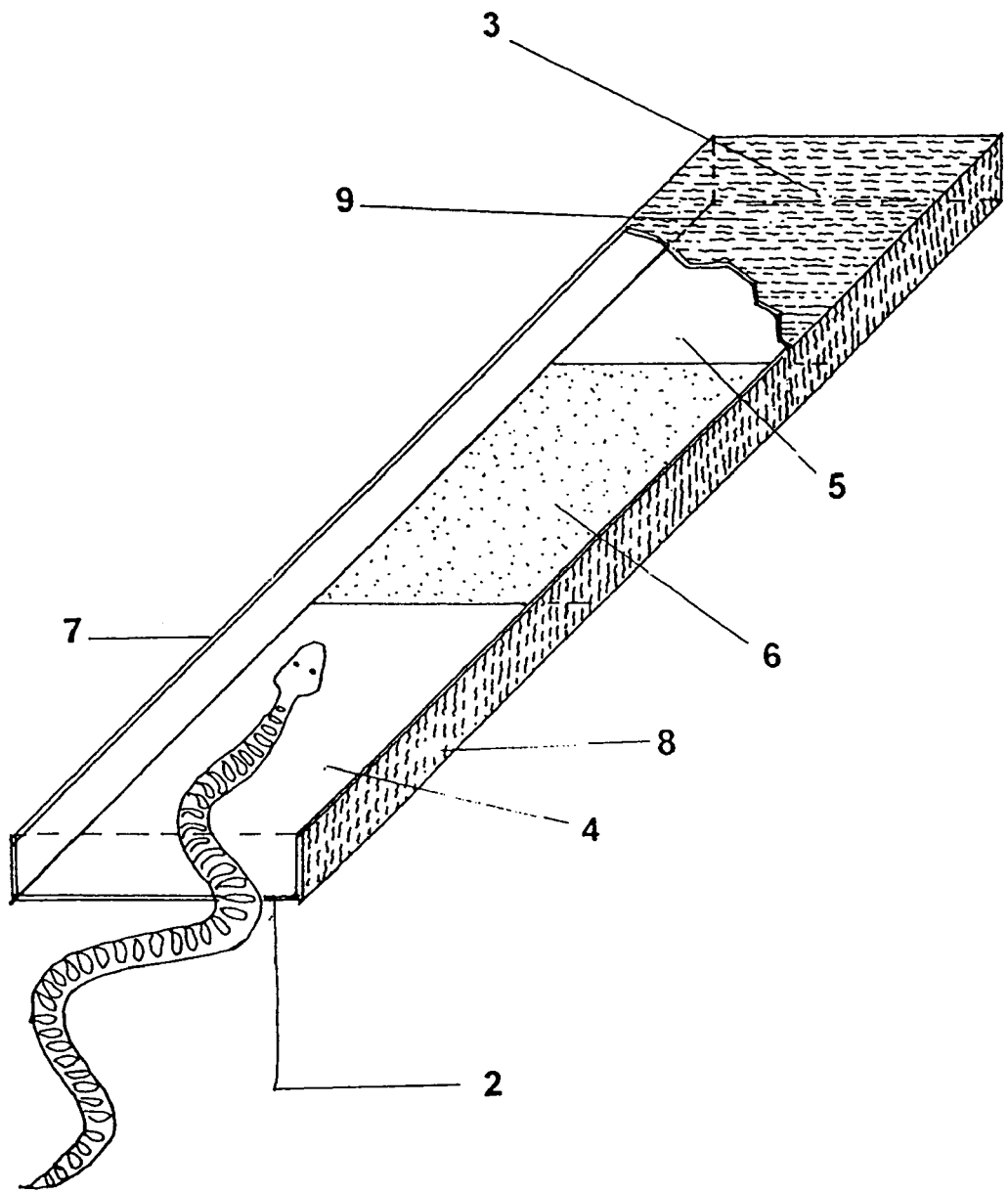
FIG. 2 is a perspective view of the present invention, showing a snake crawling within the entry area of the trap.
Figure 3:
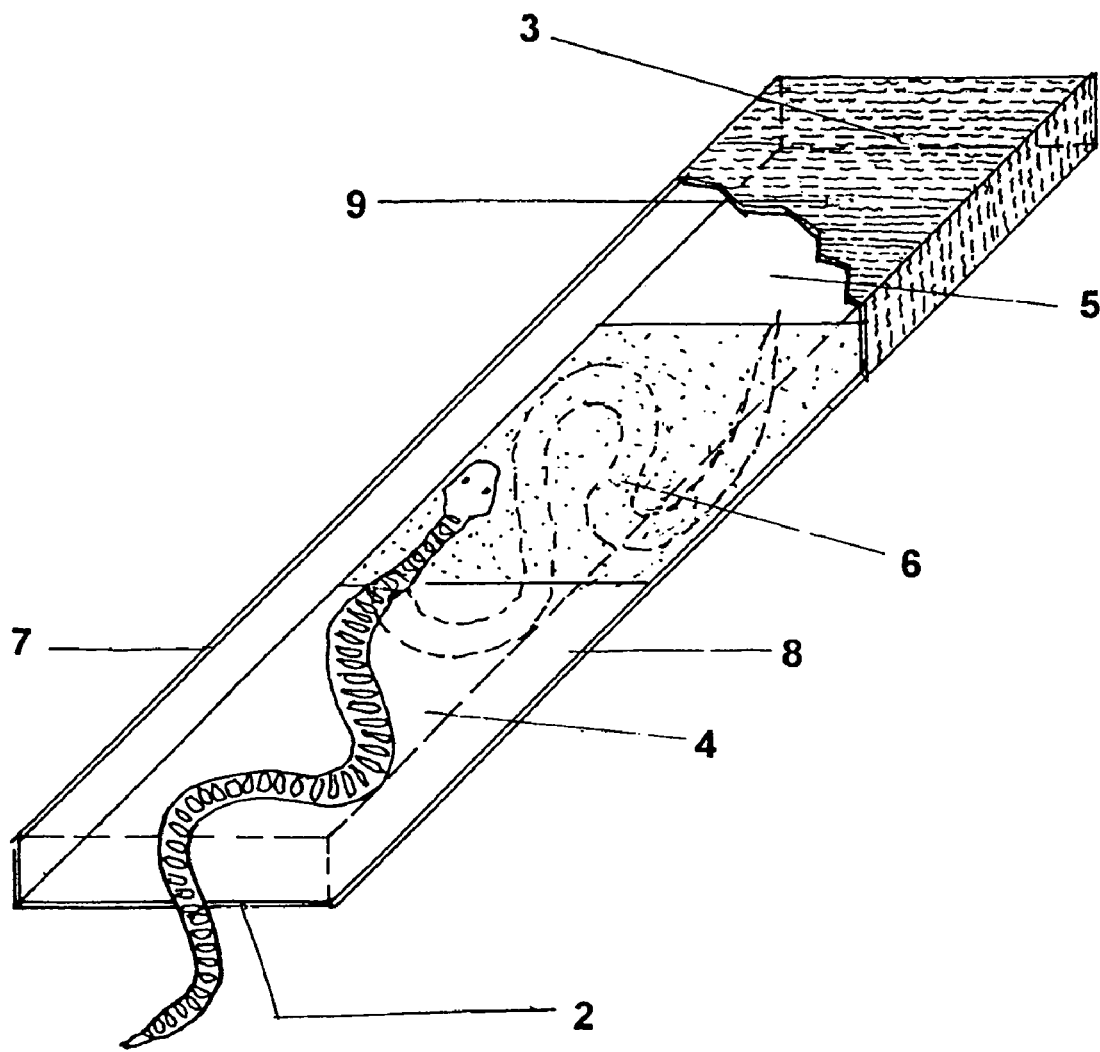
FIG. 3 is a perspective view of the present invention, showing the snake as it reaches the end of the entry area, with dotted lines showing where the snake may end up stuck to the sticky pad.

As shown in FIGS. 1-3, the preferred embodiment comprises an elongated rectangular base 1 having entry edges 2 and 3, entry areas 4 and 5 and a commercially available, replaceable sticky pad defining a sticky area 6 thereon, first and second spaced apart upstanding rigid and opposing walls 7 and 8 and a rigid top wall 9 attached to the rigid walls 7 and 8 and overlying said base member 1 such that said walls 7 and 8, top wall 9 and base 1 define a tunnel with an interior surface 10 and an exterior surface 11.

The entry areas 4 and 5 extend from the entry edges to the sticky area 6. The width and length of the entry areas are sufficient so that a snake crawling into the trap can crawl substantially into the trap before it encounters the sticky area 6. In the preferred embodiment, the interior surface 10 is smooth and slick, and the exterior surface 11 is covered with a plurality of exterior surface roughened areas 12 such that the trap may be affixed freestanding or on an even or uneven surface or wedged into position between surfaces or against a wall or other object and can be held in place by friction between the exterior surface roughened areas 12 and whatever surface or surfaces the trap is in contact with. In addition, because the walls 7 and 8, top wall 9 and base 1 of the preferred embodiment are all made of rigid materials such as moldable plastic, the trap may be wedged or tied in place without the walls 7 or 8, top wall 9 or base 1 collapsing and contacting the sticky pad and impairing or destroying the trap's effectiveness. In the preferred embodiment, the walls 7 and 8, top wall 9 and base 1 are black, thus darkening the interior of the trap and creating an attractive hiding place for snakes. The walls 7 and 8 and top wall 9 of the preferred embodiment are also water resistant so the trap can be used indoors or out.

Several common behavioral characteristics of snakes have been utilized in the design of the subject invention. First, snakes tend to crawl against or under objects or into dark hiding places. In the most common method of crawling, while there is a significant lateral component to the snake's movement, generally the snake moves forward by propelling its head forward of its body. In addition, a snake utilizes irregularities in the surface upon which it is crawling to assist in its locomotion by gripping such irregularities with its scales. Generally speaking, snakes lack the ability to "back up" by crawling backward. If a snake's head or neck is restrained, the snake will thrash the remainder of its body from side to side and/or will seek to use any rough surface or protrusion to gain leverage in an effort to free its head. The snake may also move its entire body toward the point of restraint in an effort to gain leverage to free the restrained portion of its body.

The present invention is designed to use a snake's means of locomotion and these behavioral characteristics to catch it. The invention is designed to be freestanding, and may be placed on a floor or other even or uneven surface, wedged against a wall or other object or between floor joists, rafters or the like, or tied in position. The plurality of exterior surface roughened areas 12 allow the trap to be placed anywhere snakes have been seen including on hills, in flower beds, in basements, underneath beds, etc. The rigid, waterproof base 1, top wall 9 and walls 7 and 8 allow the invention to be used indoors or out. Because of the rigidity of the walls 7 and 8 and top wall 9, the trap may also be tied in position, such as to a tree limb, without collapsing the top wall 9 or walls 7 and 8 and causing the top wall 9 or walls 7 and 8 to become stuck to the sticky pad. The dark "tunnel" effect of the interior of the invention is attractive to snakes as a place to hide. The invention includes a slick interior surface 10 and entry areas 4 and 5 on either end leading up to a commercially available replaceable sticky pad which must be inserted into and centered inside the trap. The slick entry areas 4 and 5 are of sufficient initial width and length to allow a snake to crawl substantially into the trap without encountering any adhesive. However, when the snake encounters the sticky area 6, the snake cannot crawl backward and is unable to turn around without further encountering the sticky area 6 because of the rigid confines and smooth interior surface 10 of the trap, which prevent the snake from gaining any traction to free itself. The snake is further unable to gain leverage to free its neck because of the slickness of the interior surface 10 and the rigid confines of the trap. In addition to preventing the snake from escaping the trap, the rigidity of the trap and the covered "tunnel" design protect children and pets from the sticky area 6, and protect the sticky area 6 from dust, debris, weather or contact with the other parts of the trap itself. Because of the slickness of the interior surface 10, a trapped snake and the replaceable sticky pad can be easily slid from the container without touching either by raising the opposing end of the container—the pad and snake slide out. The trap is reusable by simply inserting another sticky pad. When inserted in the trap, the pad, because it is protected by the trap, usually lasts for 12 months. The trap also catches spiders, mice and other rodents because of the attraction of the dark place to hide.

It will be appreciated by those skilled in the art having the benefit of this disclosure that this invention provides a snake trap. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An apparatus for trapping a snake comprising:
   a base wall having a smooth interior surface and an exterior surface;
   first and second side walls having a smooth interior surface and an exterior surface and having first edges attached to opposing edges of said base wall;
   a top wall having a smooth interior surface and an exterior surface and having opposing edges attached to second edges of said first and second side walls;
   wherein said first and second side walls, said base wall and said top wall define a tunnel therein, the tunnel having a smooth, non-adhesive interior surface and an exterior surface;
   a slidably removable sticky pad having a non-adhesive bottom surface that does not stick to the smooth interior surface of said tunnel, wherein said apparatus is adapted such that said sticky pad slides out of said tunnel upon the inclining of said tunnel;
   wherein said tunnel includes a first area for placing said slidably removable sticky pad for trapping the snake coming into contact with the sticky pad and a pair of second areas on opposite sides of the first area through which the snake must pass before reaching the first area, the pair of second areas having a smooth inner surface for denying traction to the snake trapped on the sticky pad and having a sufficient length and width to allow substantially an entire body of the snake to enter the tunnel prior to encountering the sticky pad.

2. The apparatus of claim 1, wherein the exterior surface of the tunnel is roughened to enable stable, free standing placement of the apparatus.

3. The apparatus as defined in claim 1, wherein said first and second side walls, said base wall and said top wall further comprise a darkened material for darkening the interior of the tunnel formed by said first and second side walls, said base wall and said top wall.

4. An apparatus as defined in claim 3, wherein said first and second side walls, said base wall and said top wall are opaque.

5. An apparatus as defined in claim 1, wherein said first and second side walls, said base wall and said top wall are made of a rigid material.

6. An apparatus as defined in claim 1 further including a smooth coating on said interior surface of said tunnel.

7. An apparatus as defined in claim 1, wherein said first and second side walls, said base wall and said top wall are made of water resistant material.

8. An apparatus for trapping a snake comprising:
   a base wall having a smooth interior surface and a roughened exterior surface;
   first and second side walls having a smooth interior surface and a roughened exterior surface and having first edges attached to opposing edges of said base wall;
   a top wall having a smooth interior surface and a roughened exterior surface and having opposing edges attached to second edges of said first and second side walls;
   wherein said first and second side walls, said base wall and said top wall define a tunnel therein having a roughened exterior surface to enable stable, free standing placement of the apparatus, the tunnel having a smooth, non-adhesive interior surface;

a slidably removable sticky pad having a non-adhesive bottom surface that does not stick to the smooth interior surface of said tunnel, wherein said apparatus is adapted such that said sticky pad slides out of said tunnel upon the inclining of said tunnel;

wherein said tunnel includes a first area for placing said slidably removable sticky pad for trapping the snake coming into contact with the sticky pad and a pair of second areas on opposite sides of the first area through which the snake must pass before reaching the first area, the pair of second areas having a smooth inner surface for denying traction to the snake trapped on the sticky pad and having a sufficient length and width to allow substantially an entire body of the snake to enter the tunnel prior to encountering the sticky pad.

9. The apparatus as defined in claim 8, wherein said first and second side walls, said base wall and said top wall further comprise a darkened material for darkening the interior of the tunnel formed by said first and second side walls, said base wall and said top wall.

10. An apparatus as defined in claim 9, wherein said first and second side walls, said base wall and said top wall are opaque.

11. An apparatus as defined in claim 8, wherein said first and second side walls, said base wall and said top wall are made of a rigid material.

12. An apparatus as defined in claim 8 further including a smooth coating on said interior surface of said tunnel.

13. An apparatus as defined in claim 8, wherein said first and second side walls, said base wall and said top wall are made of water resistant material.

14. An apparatus for trapping a snake comprising:

a base wall having a smooth interior surface and an exterior surface;

first and second side walls having a smooth interior surface and an exterior surface and having first edges attached to opposing edges of said base wall;

a top wall having a smooth interior surface and an exterior surface and having opposing edges attached to second edges of said first and second side walls;

wherein said first and second side walls, said base wall and said top wall define a tunnel therein, the tunnel having a smooth, non-adhesive interior surface and an exterior surface;

a slidably removable sticky pad having a non-adhesive bottom surface that does not stick to the smooth interior surface of said tunnel, wherein said apparatus is adapted such that said sticky pad slides out of said tunnel upon the inclining of said tunnel;

wherein said tunnel includes a first area for placing said slidably removable sticky pad for trapping the snake coming into contact with the sticky pad and a pair of second areas on opposite sides of the first area through which the snake must pass before reaching the first area, the pair of second areas having a smooth inner surface for denying traction to the snake trapped on the sticky pad and for enabling the slidable removal of the sticky pad and having a sufficient length and width to allow substantially an entire body of the snake to enter the tunnel prior to encountering the sticky pad.

15. The apparatus as defined in claim 14 wherein said first area is substantially centered between said pair of second areas and wherein said second areas have substantially equal lengths.

16. The apparatus as defined in claim 2 wherein said roughened exterior surface, when in contact with a surface, is adapted and arranged to increase friction between said exterior surface of the trap and the surface with which it is in contact.

17. The apparatus as defined in claim 8 wherein said roughened exterior surface, when in contact with a surface, is adapted and arranged to increase friction between said exterior surface of the trap and the surface with which it is in contact.

18. The apparatus as defined in claim 1 wherein said sticky pad slides out of said tunnel under the force of gravity upon the inclining of said tunnel.

* * * * *